(12) United States Patent
Rogula

(10) Patent No.: US 9,598,865 B2
(45) Date of Patent: Mar. 21, 2017

(54) ECOLOGICAL HOUSE

(71) Applicant: M3 System, LLC, Stroudsburg, PA (US)

(72) Inventor: Przemyslaw Rogula, Cracow (PL)

(73) Assignee: M3 SYSTEM, LLC, Stroudsburg, PA (US)

( * ) Notice: Subject to any disclaimer, the term of this patent is extended or adjusted under 35 U.S.C. 154(b) by 0 days.

(21) Appl. No.: 14/043,968

(22) Filed: Oct. 2, 2013

(65) Prior Publication Data

US 2014/0096455 A1 Apr. 10, 2014

Related U.S. Application Data

(60) Provisional application No. 61/709,617, filed on Oct. 4, 2012.

(51) Int. Cl.

| | | |
|---|---|---|
| E04B 1/32 | (2006.01) | |
| E04C 1/39 | (2006.01) | |
| E04B 1/98 | (2006.01) | |
| E04C 1/00 | (2006.01) | |
| E04C 1/40 | (2006.01) | |
| E04B 2/12 | (2006.01) | |
| E04C 2/20 | (2006.01) | |
| E04C 2/32 | (2006.01) | |
| E04B 1/16 | (2006.01) | |
| E04B 2/84 | (2006.01) | |
| E04H 9/02 | (2006.01) | |
| B63B 35/73 | (2006.01) | |

(52) U.S. Cl.
CPC .................. *E04C 1/39* (2013.01); *E04B 1/32* (2013.01); *E04B 1/3205* (2013.01); *E04B 1/98* (2013.01); *E04B 2/12* (2013.01); *E04C 1/00* (2013.01); *E04C 1/40* (2013.01); *E04C 2/205* (2013.01); *E04C 2/328* (2013.01); *B63B 35/732* (2013.01); *E04B 1/165* (2013.01); *E04B 2/845* (2013.01); *E04B 2/847* (2013.01); *E04B 2001/3276* (2013.01); *E04H 9/02* (2013.01)

(58) Field of Classification Search
CPC ..... E04B 2001/3258; E04B 2001/3264; E04B 2001/327; E04B 2001/3276; E04B 1/3205
See application file for complete search history.

(56) References Cited

U.S. PATENT DOCUMENTS

| | | | | |
|---|---|---|---|---|
| 3,164,928 | A | | 1/1965 | Sarros |
| 3,378,965 | A | | 4/1968 | Broquist |
| 3,750,353 | A | * | 8/1973 | Smith, Jr. .................. 52/745.08 |
| 4,113,823 | A | | 9/1978 | Iida |
| 4,590,721 | A | | 5/1986 | Berg et al. |
| 4,625,472 | A | * | 12/1986 | Busick ........................... 52/81.4 |

(Continued)

FOREIGN PATENT DOCUMENTS

| | | |
|---|---|---|
| CN | 201362855 | 12/2009 |
| EP | 0889173 | 1/1999 |

(Continued)

*Primary Examiner* — Elizabeth A Quast
(74) *Attorney, Agent, or Firm* — Gearhart Law LLC

(57) ABSTRACT

A method and means to build an ecological house with enormous monolithic foam blocks is described here. The building structure is reinforced by liquid cement filled pipes or by glass fiber mesh. The building according to this disclosure may be 1-3 floor building. The building according to this disclosure is earthquake resistant.

1 Claim, 23 Drawing Sheets

(56) References Cited

U.S. PATENT DOCUMENTS

| | | | |
|---|---|---|---|
| 4,987,707 A * | 1/1991 | Kiselev et al. | 52/88 |
| 5,060,426 A | 10/1991 | Jantzen | |
| 6,205,717 B1 * | 3/2001 | Shall et al. | 52/89 |
| 6,243,994 B1 * | 6/2001 | Bernini | 52/86 |
| 6,640,505 B1 * | 11/2003 | Heierli | 52/86 |
| D570,491 S | 6/2008 | Nishikubo | |
| 7,509,779 B2 | 3/2009 | Makovich | |
| 7,568,860 B2 * | 8/2009 | Chiaves | 405/134 |
| 8,425,153 B1 * | 4/2013 | South | 405/134 |
| 2003/0051418 A1 * | 3/2003 | Crowder | 52/80.1 |
| 2004/0045227 A1 * | 3/2004 | South | 52/80.1 |
| 2009/0013615 A1 * | 1/2009 | Kitagawa | 52/79.12 |
| 2009/0025306 A1 | 1/2009 | Reed | |
| 2009/0031621 A1 * | 2/2009 | Kitagawa | 47/17 |
| 2009/0126292 A1 * | 5/2009 | Kitagawa | 52/220.1 |
| 2010/0313490 A1 * | 12/2010 | Park et al. | 52/80.1 |
| 2012/0034375 A1 * | 2/2012 | Bree | 427/183 |
| 2012/0297698 A1 * | 11/2012 | Edwards | 52/81.6 |
| 2014/0290153 A1 * | 10/2014 | Christensen et al. | 52/86 |

FOREIGN PATENT DOCUMENTS

| | | |
|---|---|---|
| EP | 1982827 | 10/2008 |
| EP | 1992751 | 11/2008 |
| EP | 2273019 | 1/2011 |
| FR | 2567989 | 1/1986 |
| GB | 647581 | 7/1945 |
| GB | 1205497 | 9/1970 |
| JP | 2004204566 | 7/2004 |
| JP | 2006316410 | 11/2006 |
| WO | WO0019027 | 4/2000 |
| WO | WO0236896 | 5/2002 |
| WO | WO2006081214 | 8/2006 |

\* cited by examiner

ECOLOGICAL HOUSE

CLAIM OF PRIORITY

This application claims the priority of U.S. Ser. No. 61/709,617 filed on Oct. 4, 2012, the contents of which are fully incorporated herein by reference.

FIELD OF THE INVENTION

The invention relates to an ecological building. The invention relates to an ecologically efficient building made of self-supporting, low-thermal transmission monolithic polystyrene blocks. More specifically the invention relates to methods of construction using such energy efficient material as a self-supporting shell of the building.

BACKGROUND OF THE INVENTION

Prefabricated transportable building structures have been desirable to enable fast erection of buildings. The methods of construction for prefabricated structures provided in the prior art suffer from various flaws: either they are heavy (i.e. concrete or steel) and difficult to erect, or they are small and light but allow only building small one story houses. The big and heavy structures require skilled labor and a judicial permitting to erect the building. The lighter and smaller structures do not allow for the design of larger buildings and homes. Accordingly, there is a need for prefabricated transportable building structures that are relatively easy to erect, light to transport, allow construction of buildings with several floors, and additionally qualify for ecological building.

European patent application EP2273019 discloses a construction structure consisting of segments in the form of vaults created by joining shaped monolithic blocks made of foamed polystyrene or foamed polyurethane, with blocks having their internal surfaces unidirectional according to a segment of an approximation of a circle and their sum forms the shape of internal surface of segment's vault. The radius of the vault is limited and therefore the size of the buildings made according to this method is limited to one story buildings and limited dimensions.

U.S. Pat. No. 5,060,426 discloses an easily transportable building structure formed in part as a vault made of interlocking voussoirs in the form of identical insulated boxes each weighting less than 200 pounds. Permanent exterior joint connectors prestress the voussoirs for strength. Easily installed interior clips join the voussoirs. A floor made of insulated boxes is supported on a quickly-assembled adjustable structure frame. End walls made of insulating boxes close the end of the vault or vaults. External cladding and interior finishing panels, corresponding generally to the dimensions of the voussoirs, are easily installed and removed. Interior raceways are formed along the joinder lines of the insulated boxes. All of the parts of the structure are designed for erection of the structure in harsh environments, without handling small loose parts.

Other known art discloses various lightweight construction structures. For example, European patent application number EP1982827 discloses a lightweight construction structure comprising a sandwich panel with a heat-sensitive core between two outer sheets. Connectors at either end of the panel are welded to it using friction stir welding.

International patent application publication WO2006/081214 discloses a rapidly-erectable lightweight load resisting system for the construction of arched bridges, tunnels, underground bunkers or storage facilities, and hangars. It has a plurality of lightweight arched hollow tubular support members which are formed of fiber reinforced polymer material and are substantially oriented in a vertical plane. The lightweight tubular support members are connected by at least one or more lateral force resisting members which are positioned in a direction perpendicular to the vertical plane of the tubular support members, and which are capable of transferring vertical loads to the tubular support members and of providing lateral-load capacity to the load resisting system. The tubular support members are fitted with one or more holes near the top which allow them to be filled with a suitable material to provide additional strength or stiffness.

International patent application publication WO2000019027 discloses an ultra-light framework in particular for building an ecological house with very low energy consumption. It defines the skeleton of the various main parts of a building such as the floor, walls, a ceiling and a roof and is characterized in that the skeleton of said main parts consists of several identical base section elements assembled together by nodes so as to form a single three-dimensional system, said node being designed for receiving at most eight base elements arranged in a common plane and at most four base elements arranged at least on one side of said plane and inclined at 45 degrees relative to said plane.

U.S. Pat. No. 7,509,779 discloses a lightweight and portable building block for construction of a structure, such as house. The building block has a first portion that can be made from a thermally insulating material such as foam. The building block also has a second portion that can be made from a material having a high compressive strength. The first and second portions are affixed to each other to provide a preformed building block with a high compressive strength. The rigid portion can be a number of rigid sheets substantially embedded in the lightweight portion.

Other known art discloses various arch structures:

U.S. Pat. No. 4,590,721 discloses an arch structure for an earth sheltered building including a plurality of curved wood panel sections arranged in tandem and in a plurality of adjacent rows. The sections are joined adhesively and define an arch resting on a foundation of footings. Each of the panel sections includes side members joined to end members and ribs extending between the side members and between the end members. Joined to the members are top and bottom skins which enclose the panel and in conjunction with the ribs define a plurality of compartments. Insulation material is disposed within the compartments. At least one of the skins is offset on the side members to define male and female portions which are joined with panel sections in adjacent rows. The panels are fabricated from wood.

U.S. Pat. No. 3,164,928 discloses an arch structure which can be manufactured from masonry materials and which employs preformed concrete blocks as part thereof, bonded with and constituting an integral part of the complete structure and constituting a fluent material during casting of the structure.

There are publications teaching further architectural structures, such as European patent application EP1992751 disclosing an architectural structure having a main frame of honeycomb configuration that is erected vertically and expands in a plane, a structural unit therefore, and a method for constructing the same.

Insulation systems and passive buildings have been described for example in European patent application number EP1330579 disclosing a passive building comprising a heat insulation system. The disclosure provides a heat insulation essentially surrounding the wall, roof and floor surfaces from the outside in the form of a closed shell.

Various systems for reinforcing building structures are disclosed in known art:

European patent application number EP 889173 provides a reinforced frame for structures and a construction method of a building structure using the same. The reinforced frame for structures of the invention comprises basic plates and connection plates that are fastened with one another by connecting strings.

French patent application number FR2567989 discloses a self-supporting construction structure characterized in that it consists of a trellis made of expanded metal, some of the wires of which, define the diamond shaped meshes, are cut and bent in at least one same direction so as to form anchoring projections at least on one side of the plane of the trellis.

U.S. Pat. No. 3,378,965 discloses a reinforced concrete arch structure having a pre-stressed core imbedded in the concrete and comprising a number of sections consisting of parts adapted to be assembled in the field and to be pre-stressed during or after erection.

U.S. Pat. No. 4,113,823 discloses a method of manufacturing pre-stressed concrete pipes comprising arranging a reinforcing cage in a form, casting expansive concrete within the form in such manner that the reinforcing cage is disposed outwardly of the center of the wall thickness of the concrete layer and then forming the pipe centrifugally.

Accordingly, even if lightweight building structures are known, and methods to construct ecological houses as well as various methods to reinforce building structures are known, there are no methods providing light weight monolithic building blocks that would include reinforcing light weight structures and that could be easily and quickly assembled, provide ecological insulation and enable a passive house. The known art enables only construction of polystyrene monolithic structures of limited size. Furthermore, there is no teaching of ecological houses made of polystyrene blocks that would be earth quake or fire resistant, or capable of having more than one floor.

Accordingly, there is a need for a novel specification of structures and methods of construction to improve the known art to provide ecological house easy to construct, and having all the above features the known art does not enable.

Embodiments of this invention are illustrated in the accompanying drawings and will be described in more detail herein below.

SUMMARY OF THE INVENTION

The invention of the present disclosure is distinguished over the prior art in general and particularly the instant disclosure solves the above flaws of the prior art.

It is an object of this invention to provide an easy to construct ecological house.

It is another object of this invention to provide an ecological house made of monolithic polystyrene blocks that are reinforced.

Another object of this invention is to provide a method to build a house made of polystyrene block structures with large dimensions and more than one story.

It is a further object of this invention to provide methods to reinforce polystyrene block constructions.

Another object of this invention is to provide an earthquake resistant ecological house made of polystyrene block structures.

Still another object of this invention is to provide a fire resistant ecological house made of polystyrene block structures.

Yet another object of the invention is to provide a house meeting passive house standards.

Another object of this invention is to provide a floating house made of monolithic foam blocks.

Another object of this invention is to provide a reinforced monolithic foam block for use in building construction.

Still another object of this invention is to provide a method to build an ecological house by using large reinforced monolithic foam blocks.

It is an object of this invention to provide a reinforced monolithic foam block building comprising: a) at least one vault structure, said vault structure comprising a wall block, a roof block and mirror images thereof, the wall block having a vertical axis, a horizontal axis, two flat sides, an upper end, a flat lower end, an outer surface and an inner surface, the outer surface being substantially flat and the inner surface having a bottom end and a top end and being curved perpendicularly with the vertical axis from its top end and being flat at its bottom end; the roof block having a vertical axis, a horizontal axis, two flat sides, a lower end, a flat upper surface, an outer surface and an inner surface, the outer surface being flat and the inner surface having a bottom end and a top end and being curved perpendicularly with the vertical axis from the bottom and the top ends; the wall block and the roof block being attached to each other by fitting the lower end of the roof block to the upper end of the wall block thereby forming a first half of a vault formed by the curved inner surfaces; the mirror images being attached to each other thereby forming a second half of a vault formed by the curved inner surfaces; the first and the second halves of vault being attached together to form the vault structure; optionally two or more vault structures being attached together from the flat sides of the wall and the roof blocks, thereby forming a foam core of the building; and b) a fiberglass mesh coiled around the foam core, said mesh having loose edges, said loose edges being wrapped under a foundation slab, sandwiched between the flat lower surfaces of the wall blocks and the foundation slab or sandwiched between separate attachment elements, wherein the vertical axis of the blocks is 10 to 12 meters and the vault has a radius between 6 and 12 meters.

It is another object of this invention to provide a reinforced two story monolithic foam block building comprising: a) at least one vault structure, said vault structure comprising a wall block, a roof block and mirror images thereof, the wall block having a vertical axis, a horizontal axis, two flat sides, an upper end, a flat lower end, an outer surface and an inner surface, the outer surface being substantially flat and the inner surface having a bottom end and a top end and being curved perpendicularly with the vertical axis from its top end and being flat at its bottom end; the roof block having a vertical axis, a horizontal axis, two flat sides, a lower end, a flat upper end and an outer surface and an inner surface, the outer surface being flat and the inner surface having a bottom end and a top end and being curved perpendicularly with the vertical axis from the bottom and the top ends; the wall block and the roof block being attached to each other by fitting the lower end of the roof block to the upper end of the wall block thereby forming a first half of a vault formed by the curved inner surfaces; the mirror images being attached to each other thereby forming a second half of a vault formed by the curved inner surfaces; the first and the second halves of vault being attached together to form the vault structure; optionally two or more vault structures being attached together from the flat sides of the wall and the roof blocks, thereby forming a foam core of the building; b) a second story floor attached to wall blocks; and c) a double layered fiberglass mesh coiled around the foam core, and having an inner layer and an outer layer, the outer layer having loose edges and said loose edges being wrapped under the foundation slab, and the inner layer having loose edges and said loose edges being sandwiched between attaching elements, said attaching elements locating in the wall blocks in close proximity with the second story floor.

It is yet another object of this invention to provide a reinforced monolithic foam block building comprising: a) at least one vault structure, said vault structure comprising at least one wall block, optionally one or more center blocks, at least one roof block and mirror images thereof, the wall blocks having a vertical axis, a horizontal axis, two flat sides, an upper end, a lower end, an outer surface and an inner surface, the outer surface and the inner surface having a bottom end and a top end and being curved perpendicularly with the vertical axis from the top ends, the roof blocks and the center blocks having a vertical axis, a horizontal axis, two flat sides, an upper end, a lower end, an outer surface and an inner surface, the outer surface and the inner surface having a bottom end and a top end and being curved perpendicularly with the vertical axis from the top ends and from the bottom ends; the top ends of the wall blocks being attached to the bottom ends of the center locks, and the top ends of the center blocks being attached to roof blocks, thereby forming a first half of a vault formed by the curved inner surfaces; the mirror images being attached to each other thereby forming a second half of a vault formed by the curved inner surfaces; the first and the second halves of vault being attached together to form the vault structure where the outer surfaces form an outer half circle; optionally two or more vault structures being attached together from the flat sides of the blocks, thereby forming a foam core of the building; and b) double layered fiberglass mesh coiled around the foam core, said layered fiberglass mesh having an outer layer and an inner layer, said outer layer having a loose end, said loose end being wrapped under a foundation slab or between separate attaching elements, and said inner layer having a loose end, said loose end being sandwiched between the flat bottom surfaces of the wall blocks and the foundation slab, wherein the vertical axis of the blocks is 10 to 12 meters and the vault has a radius between 6 and 12 meters.

Another object of this invention is to provide a reinforced monolithic foam block building comprising: a) a desired number of vault structures, said vault structures comprising a wall block, a roof block and mirror images thereof, the wall block having a vertical axis, a horizontal axis, two flat sides, an upper end, a flat lower end, an outer surface and an inner surface, the outer surface being flat and the inner surface having a bottom end and a top end and being curved perpendicularly with the vertical axis from its bottom end and being flat at its top end; the roof block having a vertical axis, a horizontal axis, two flat sides, a lower end, a flat upper end and an outer surface and an inner surface, the outer surface being flat and the inner surface having a bottom end and a top end and being curved perpendicularly with the vertical axis from the bottom and the top ends; the wall block and roof block being attached to each other by fitting the lower end of the roof block to the upper end of the wall block thereby forming a first half of a vault formed by the curved inner surfaces; the mirror images being attached to each other thereby forming a second half of a vault formed by the curved inner surfaces; the first and the second halves of vault being attached together to form the vault structure; said vault structures being attached together from the flat sides of the wall and the roof blocks, thereby forming a foam core of the building; and b) a desired number of liquid cement reinforced polyvinylchloride pipes, said pipes being inserted inside selected vault structures, wherein the vertical axis of the blocks is 10-12 meters and the vault has a radius between 6 and 12 meters.

A further object of this invention is to provide a reinforced monolithic foam block floating building comprising: a) at least one vault structure, said vault structure comprising a wall block, a roof block and mirror images thereof, the wall block having a vertical axis, a horizontal axis, two flat sides, an upper end, a flat lower end an outer surface and an inner surface, the outer surface being substantially flat and the inner surface having a bottom end and a top end and being curved perpendicularly with the vertical axis from its top end and being flat at its bottom end; the roof block having a vertical axis, a horizontal axis, two flat sides, a lower end, a flat upper an outer surface and an inner surface, the outer surface being flat and the inner surface having a bottom end and a top end and being curved perpendicularly with the vertical axis from the bottom and the top ends; the wall block and the roof block being attached to each other by fitting the lower end of the roof block to the upper end of the wall block thereby forming a first half of a vault formed by the curved inner surfaces; the mirror images being attached to each other thereby forming a second half of a vault formed by the curved inner surfaces; the first and the second halves of vault being attached together to form the vault structure; optionally two or more vault structures being attached together from the flat sides of the wall and the roof blocks, thereby forming a foam core of the building; and b) a fiberglass mesh coiled around the foam core, said mesh having loose edges, said loose edges being wrapped under a floating platform, sandwiched between the flat lower surfaces of the wall blocks and the floating platform or sandwiched between separate attachment elements, wherein the vertical axis of the blocks is 10 to 12 meters and the vault has a radius between 6 and 12 meters.

Still another object of this invention is to provide a monolithic foam block for construction of a building, said foam block having a vertical axis, a horizontal axis, two flat sides, an upper end, a lower end, an outer surface and an inner surface, the inner surface having a bottom end and a top end and being curved perpendicularly with the vertical axis from its top end and optionally from its bottom end, the outer surface having a bottom end and a top end and being flat or curved perpendicularly with the vertical axis from its top end and optionally from its bottom end; and said monolithic blocks having at least one tunnel drilled perpendicularly with the vertical axis of the block, said tunnel being suitable for inserting a reinforcing pipe inside the block.

An even further object of this invention is to provide a monolithic foam block for construction of a building, said foam block having a vertical axis, a horizontal axis, two flat sides, an upper end, a lower end, an outer surface and an inner surface, the inner surface having a bottom end and a top end and being curved perpendicularly with the vertical axis from its top end and optionally from its bottom end, the outer surface having a bottom end and a top end and being flat or curved perpendicularly with the vertical axis from its top end and optionally from its bottom end; and said monolithic block having a vertical groove on the flat sides, said vertical groove having a cross section forming a half circle with a radius substantially similar to a radius of a reinforcing pipe suitable to be inserted into the groove.

Yet another object of this invention is to provide a monolithic foam block for construction of a building, said foam block having a vertical axis, a horizontal axis, two flat sides, an upper end, a lower end, an outer surface and an inner surface, the inner surface having a bottom end and a top end and being curved perpendicularly with the vertical axis from its top end and optionally from its bottom end, the outer surface having a bottom end and a top end and being flat or curved perpendicularly with the vertical axis from its top end and optionally from its bottom end; and said monolithic block having a vertical groove on one flat side, and a connection protrusion on another flat side, said vertical groove having a cross section of a half circle and said connection protrusion having a cross section of a half circle with a radius substantially similar to a radius of the groove cross section, whereby two blocks can be attached to each other by fitting the protrusion of one block into the grove of another block.

DESCRIPTION OF THE PREFERRED EMBODIMENTS

Figure 1A:
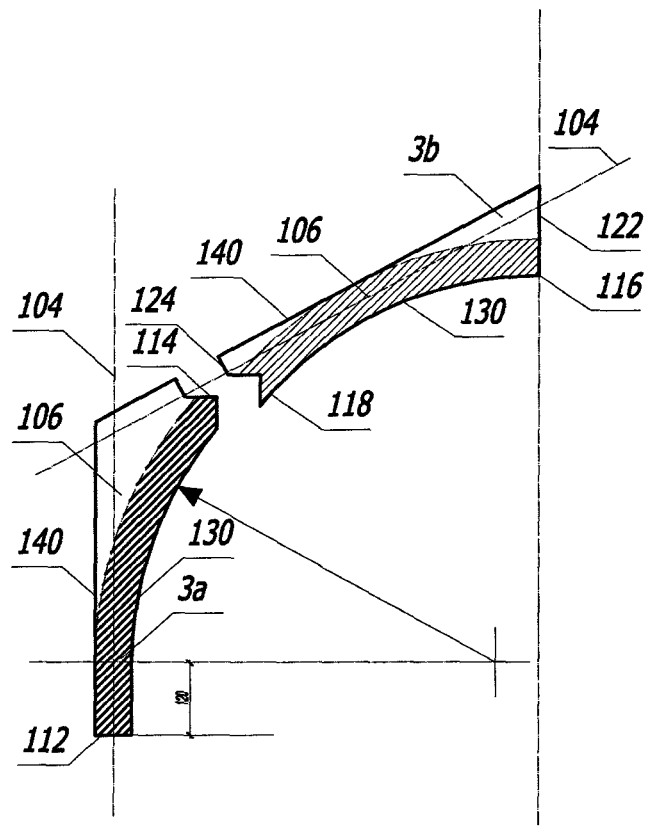
FIG. 1A shows vertical cross views of wall and roof blocks according to one preferred embodiment.

The preferred embodiments of the present invention will now be described with reference to FIGS. 1-12. Identical elements in the various figures are identified with the same reference numerals.

FIG. 1A shows vertical cross sectional views of different blocks. The figure shows a wall block 3a and a roof block 3b. The figure shows the vertical axis 104 of the blocks. The wall blocks 3a have a flat lower end 112 and a shaped upper end 114. The wall blocks 3a have a flat outer surface 140 and an inner surface 130 that is curved perpendicularly to the vertical axis 104 from its top end 116. The roof block 3b has a flat upper end 122 and a shaped lower end 124. The roof block has a flat outer surface 140 and an inner surface 130 that is curved perpendicularly with the vertical axis 104 from its top end 116 and from its bottom end 118.

Figure 1B:
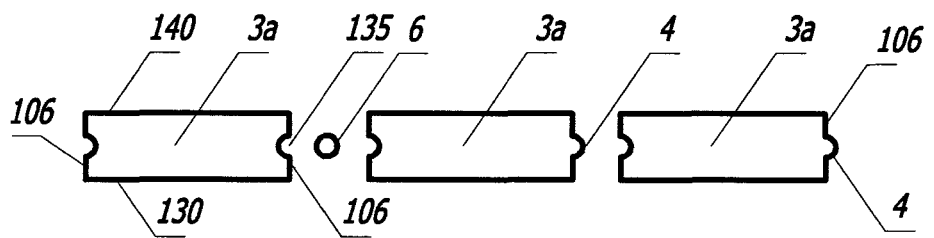
FIG. 1B shows horizontal cross sections of wall, center or roof blocks according to one preferred embodiment.

FIG. 1B is a horizontal cross section of either a wall block, center block or a roof block according to one preferred embodiment. The figure shows the outer surface 140 and the inner surface 130 and two flat sides 106. The figure shows a half circle cross section of vertical grooves 135 at both flat sides of the block. The figure also shows a cross section of a reinforcing cement pipe 6 that snugly fits to a tubular tunnel formed by two vertical grooves 135 of adjacent blocks. FIG. 1B also shows connection protrusion 4 of the blocks where no reinforcing pipe is applied.

Figure 2A:
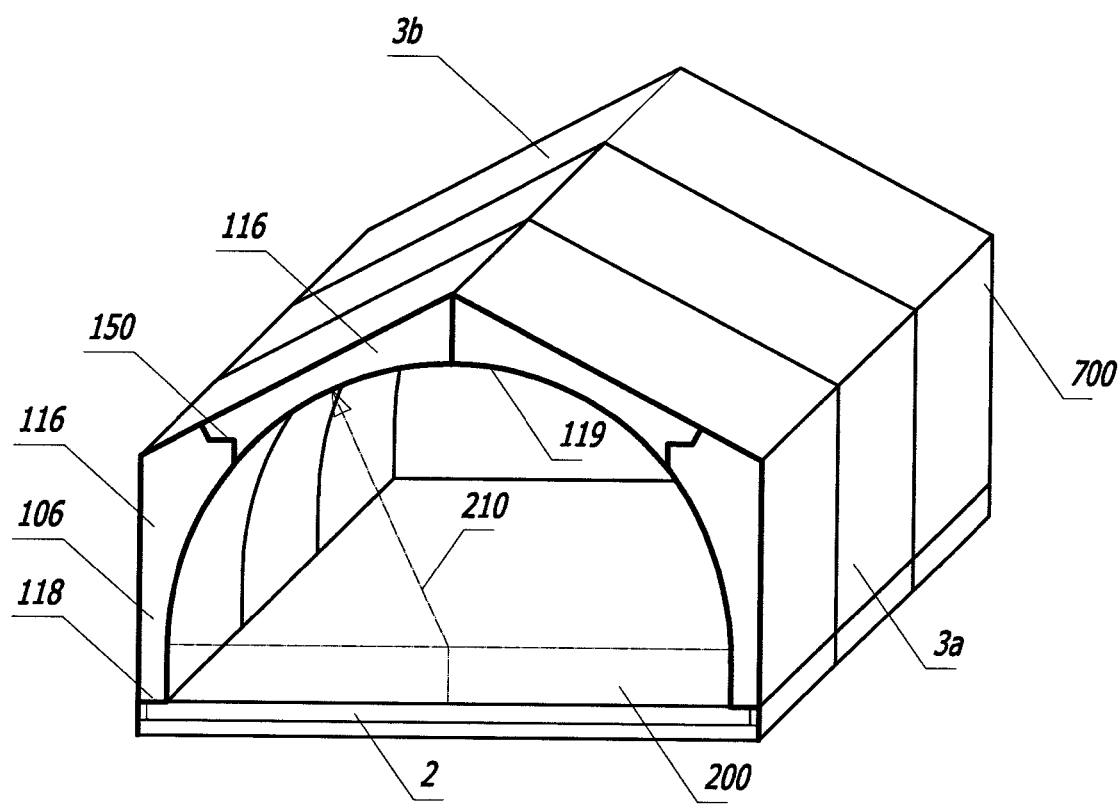
FIG. 2A is a vertical perspective front view of a building according to one embodiment of the invention.

FIG. 2A is a vertical perspective front view of a building according to one embodiment of the invention. The figure shows foam core 700 formed of wall blocks 3a and roof blocks 3 b and their mirror images made of expanded polystyrene and forming vault structures 119 when joined together, flat sides of the blocks 106, top ends 116, bottom ends 118, joints between the blocks 150, vault 200, radius of the vault 210, foundation slab 2.

Figure 2B:
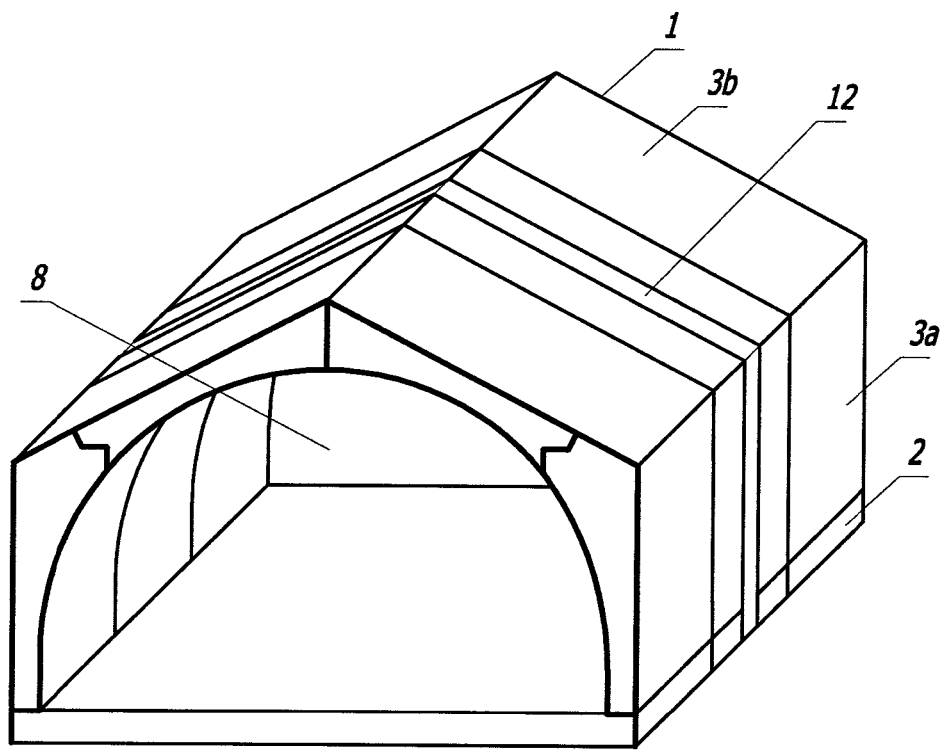
FIG. 2B is a vertical perspective front view of a building according to another embodiment of the invention.

FIG. 2B shows a vertical perspective front view of a building according to another embodiment. The figure shows the foundation slab 2, the wall blocks 3a, the roof blocks 3b, an interior of the building 8, and a belt 12 securing the vault structures together.

Figure 3A:
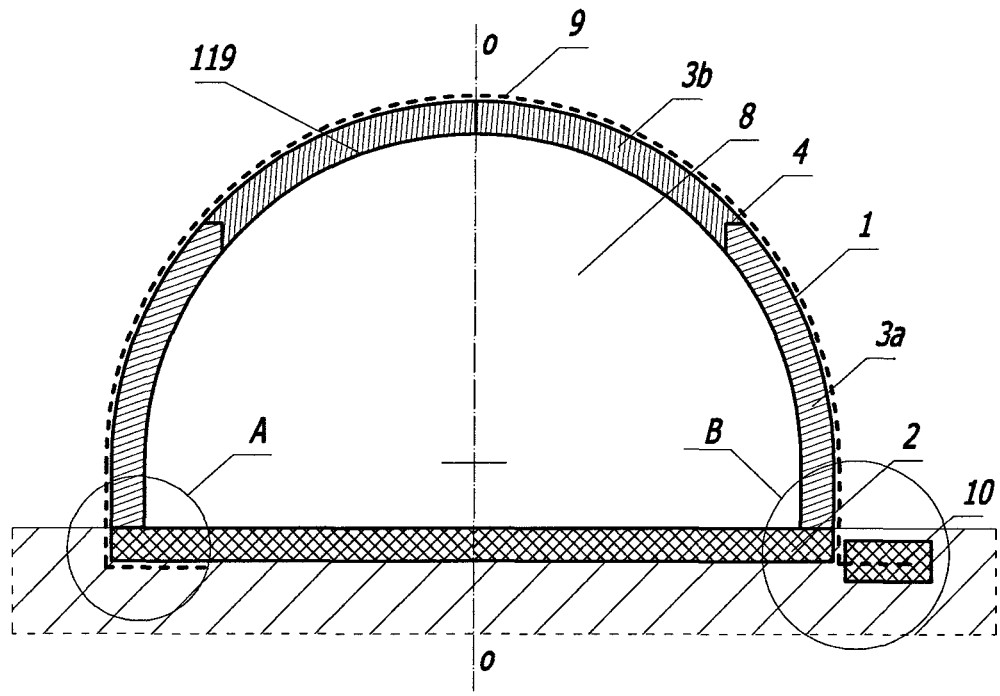
FIG. 3A shows a vertical cross section of one embodiment of the invention.

FIG. 3A is a vertical cross section of a building 1 according to one embodiment of the invention. The figure shows wall blocks 3a, roof blocks 3b and their mirror images made of expanded polystyrene and forming a vault structure 119 when joined together. The figure shows the interior of the building 8, the foundation slab 2, fiber glass mesh 9, and attachment elements 10 to attach the edge of the mesh.

Figure 3B:
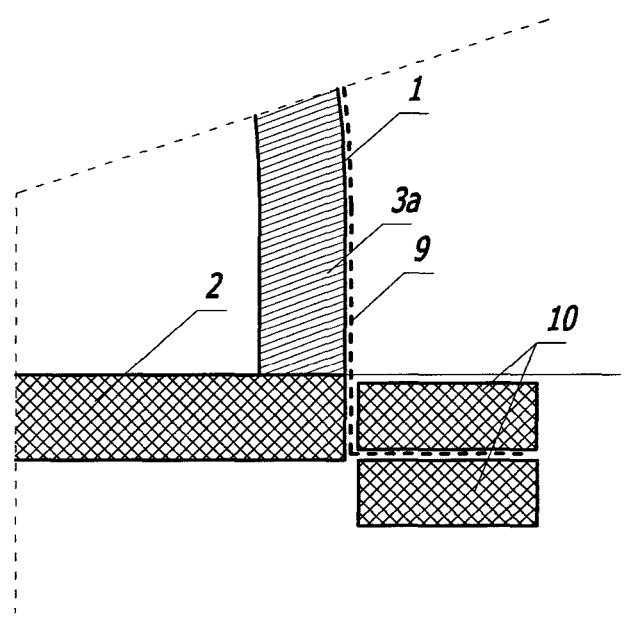
FIG. 3B shows a detail of FIG. 3A.

FIG. 3B is a detail of FIG. 3A and shows a wall block 3a, fiber glass mesh 9, foundation slab 2 and attachment element 10 to attach the edge of the mesh.

Figure 4:
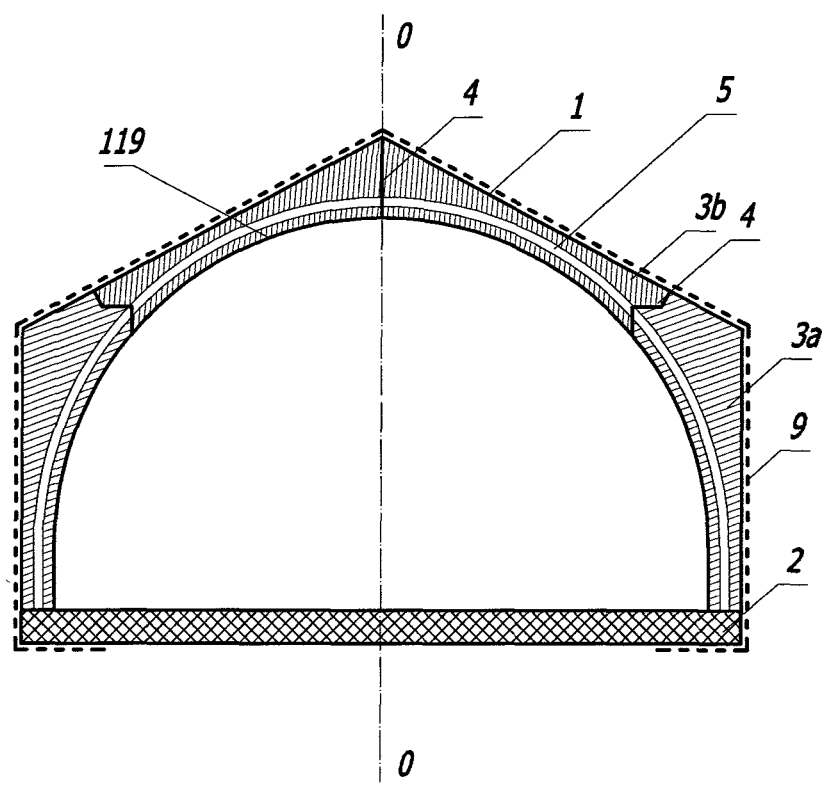
FIG. 4 shows a vertical cross section of another embodiment of the invention.

FIG. 4 is a vertical cross section of a building according to one embodiment of the invention. The figure shows wall blocks 3a, roof blocks 3b, their mirror images, made of expanded polystyrene and forming a vault structure 119 when joined together. Mirror image in this disclosure means a structure that is a mirror image in a sense that the blocks and their mirror images are capable of forming a vault structure when attached together. Mirror image definition of this disclosure does not require that the structures have any other features common, such as windows, doors or other additional structures. The figure shows the foundation slab 2, the fiber glass mesh 9, the joints of the blocks 4, and a conduit for reinforcing pipe 5.

Figure 5A:
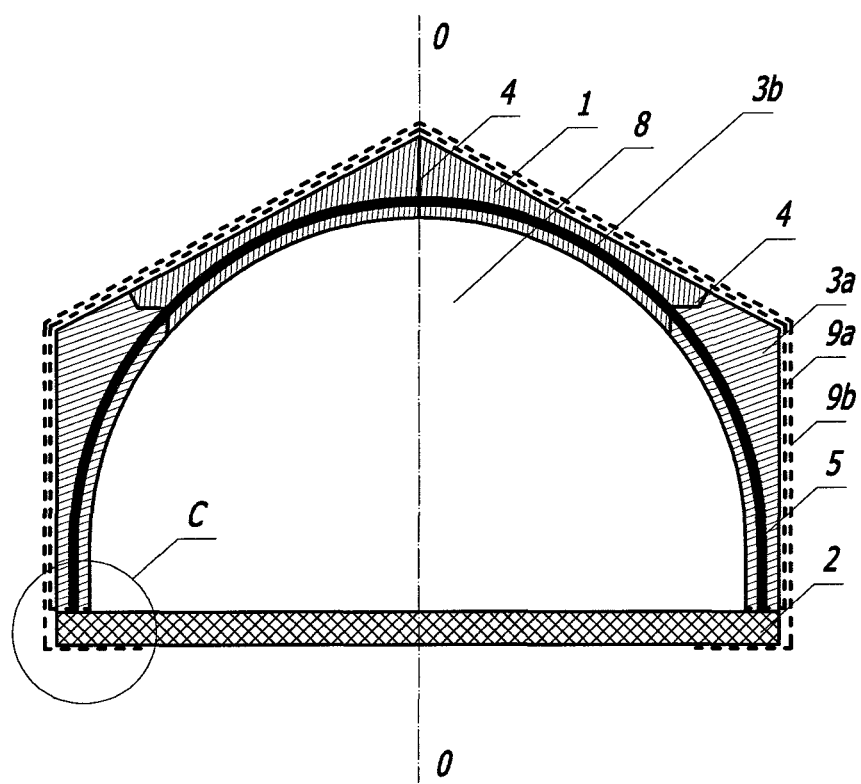
FIG. 5A shows a vertical cross section of yet another embodiment of the invention.

FIG. 5A shows another vertical cross section of a building according to another embodiment of the invention. The figure shows wall blocks 3a, and roof blocks 3b made of expanded polystyrene. The figure shows bottom layer of fiber glass mesh 9a and outer layer of the mesh 9b. The figure shows the joints of the blocks 4, the conduit for the reinforcing pipe 5, interior of the building 8 and the foundation slab 2.

Figure 5B:
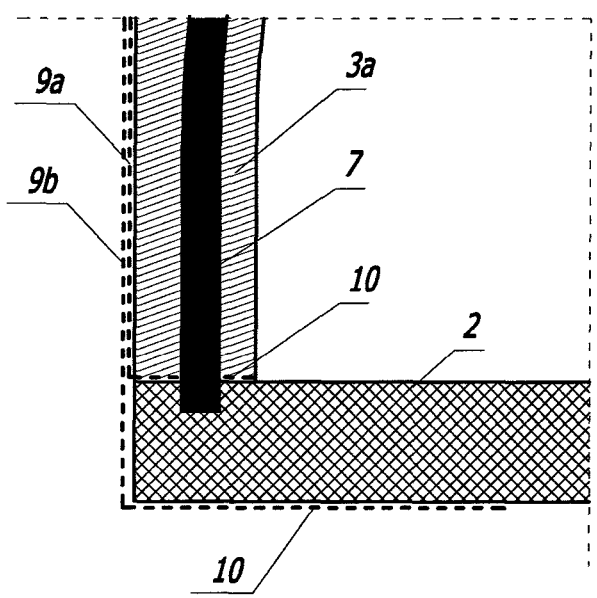
FIG. 5B shows a detail of FIG. 5A.

FIG. 5B is a detail of FIG. 5A. The figure shows foundation slab 2, wall block 3a, inner layer of fiber glass mesh 9a, outer layer of fiber glass mesh 9b, attachment of the edge of the mesh 10, and vertical cross section of a reinforcing pipe 7.

Figure 5C:
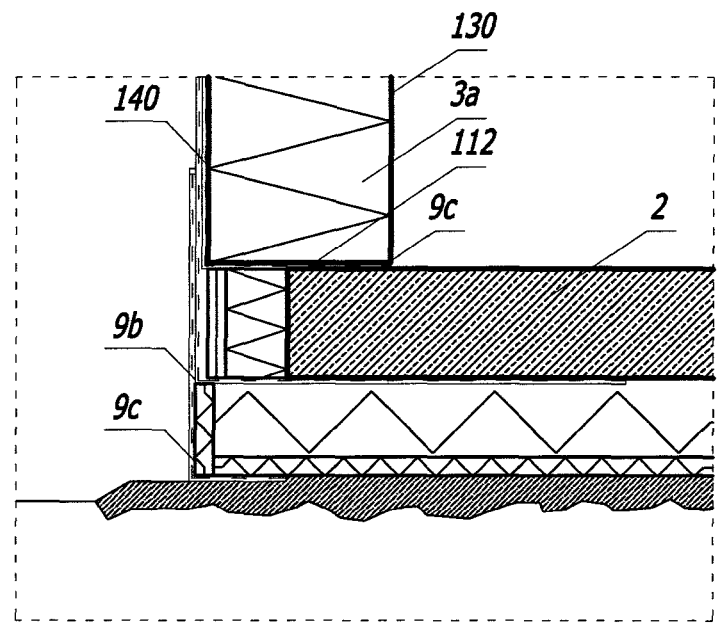
FIG. 5C shows connection of reinforcing mesh according to further embodiments.

FIG. 5C is a detail of attachment of the fiber glass mesh according to another embodiment. The figure shows foundation slab 2, a wall block 3a, an inner surface of the block 130, an outer surface of the block 140. An inner layer of fiber glass mesh 9a, a outer layer of fiber glass mesh 9b, and a third layer of fiber glass mesh 9c.

Figure 6A:
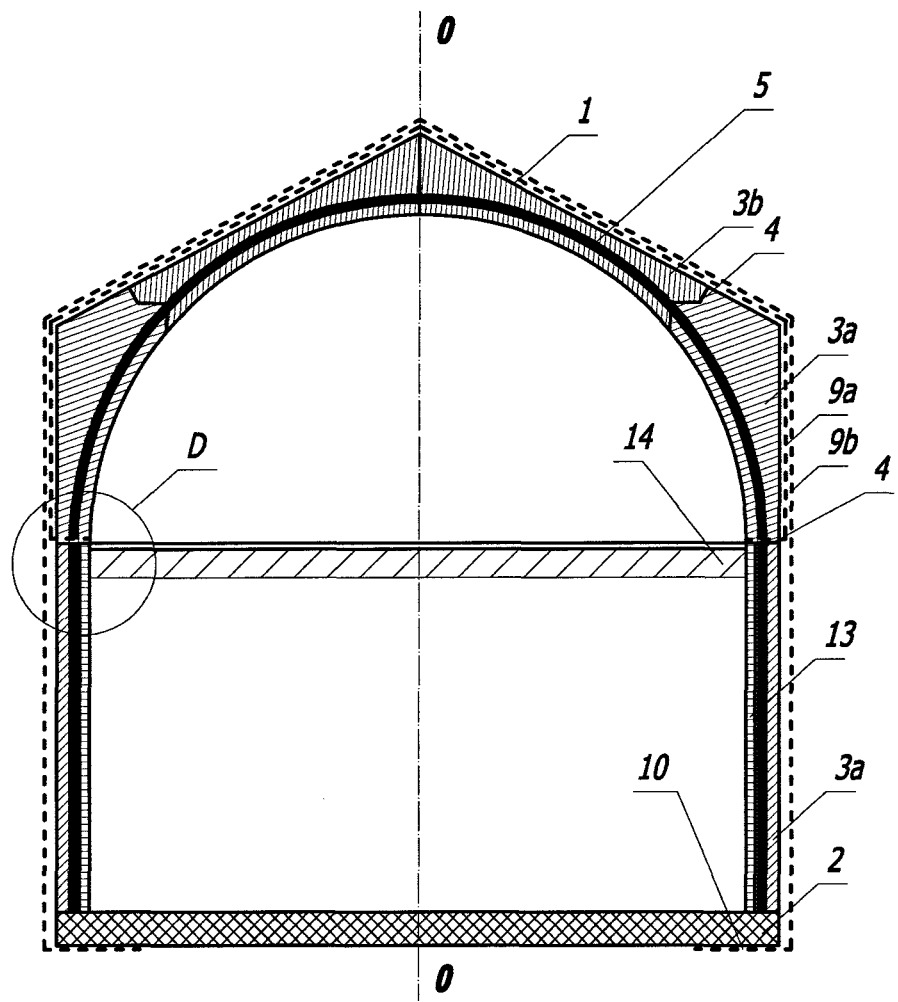
FIG. 6A is vertical cross section of another embodiment of the invention.

FIG. 6A is a vertical cross sectional view of a building according to one embodiment of the invention. The figure shows wall blocks 3a and roof blocks 3b, foundation slab 2, joints between the blocks 4, conduit for the reinforcing pipe 5, inner layer of the fiber glass mesh 9a, outer layer of the fiber glass mesh 9b, attachment element to attach the edge of the mesh 10, floor support 13, and a second story floor 14. Detail D is shown in FIG. 6B.

Figure 6B:
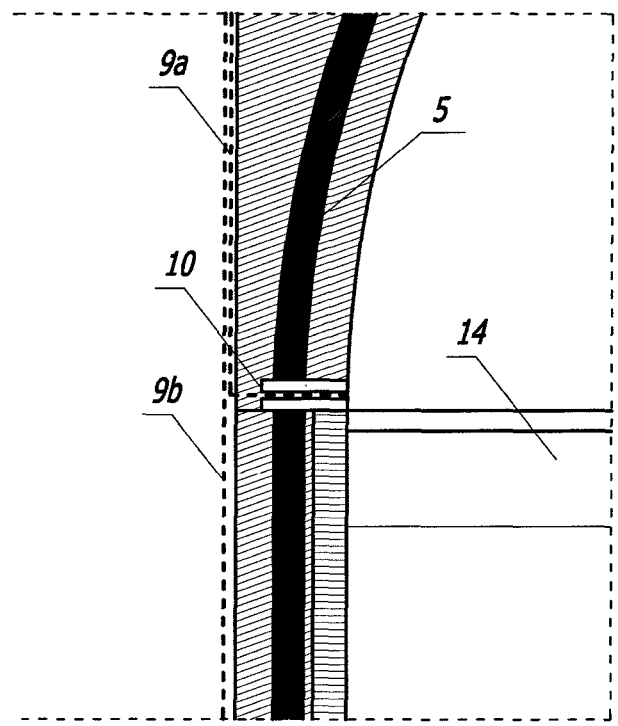
FIG. 6B shows a detail of FIG. 6A.

FIG. 6B is a detail D of FIG. 6A. The figure shows second story floor 14, conduit for the reinforcing pipe 5, bottom layer of fiber glass mesh 9a, outer layer of fiber glass mesh 9b, and attachment element 10 to attach the edge of the mesh 10.

Figure 7:
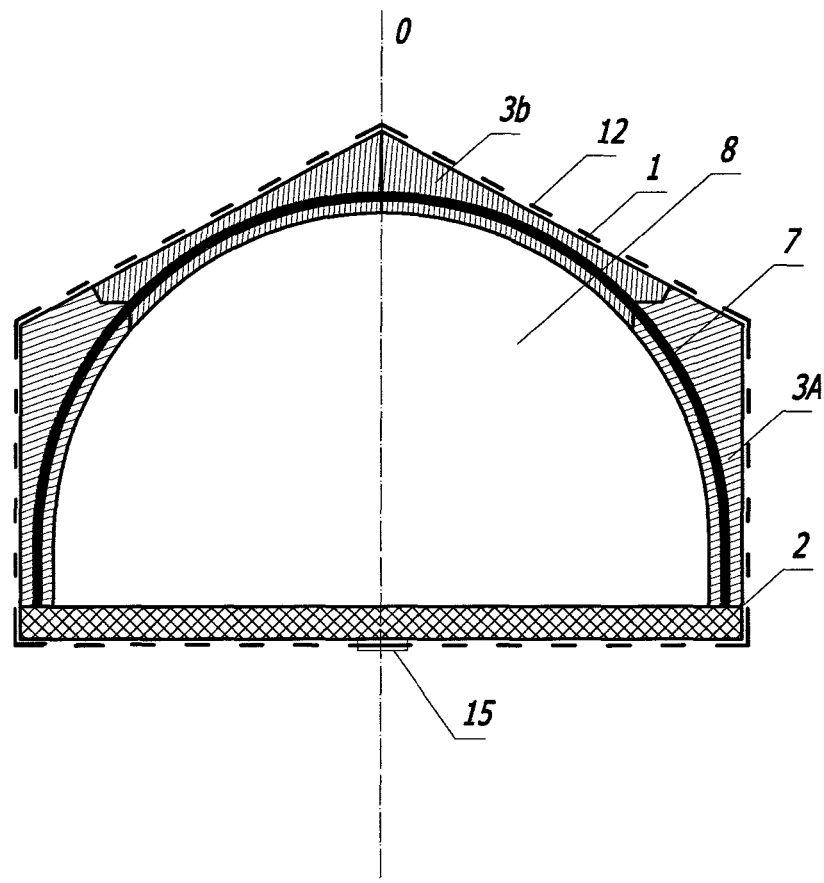
FIG. 7 shows a vertical cross section of yet another embodiment of the invention.

FIG. 7 is a vertical cross sectional view of the building according to one embodiment of this invention. The figure shows, a foundation slab 2, a wall block 3a and roof block 3b and mirror images thereof. The figure shows the interior of the building 8, a vertical cross section of a reinforced pipe 7, a belt made of synthetic fiber 12 and connection of belt ends 15.

Figure 8A:
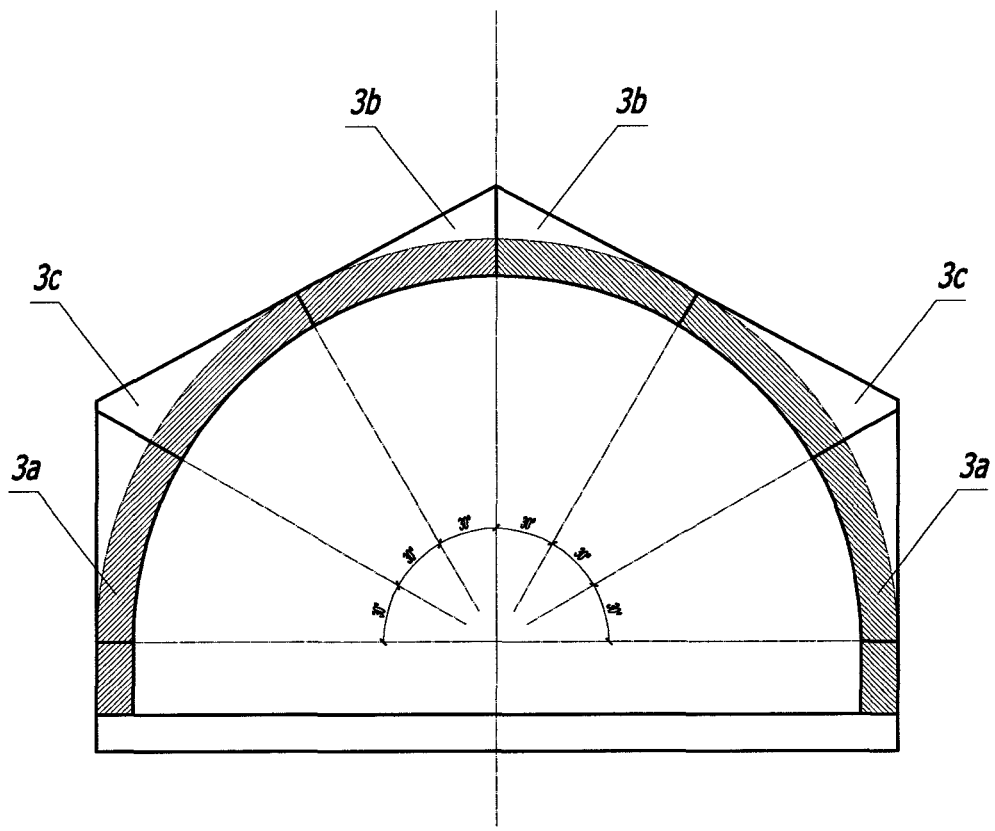
FIG. 8A shows a vertical cross section of yet another embodiment of the invention.

FIG. 8A is a vertical cross sectional view of a building according to another embodiment of this invention. The figure shows, a foundation slab 2, wall blocks 3a, center blocks 3c, roof blocks 3b and a conduit for reinforcing pipe 7.

Figure 8B:
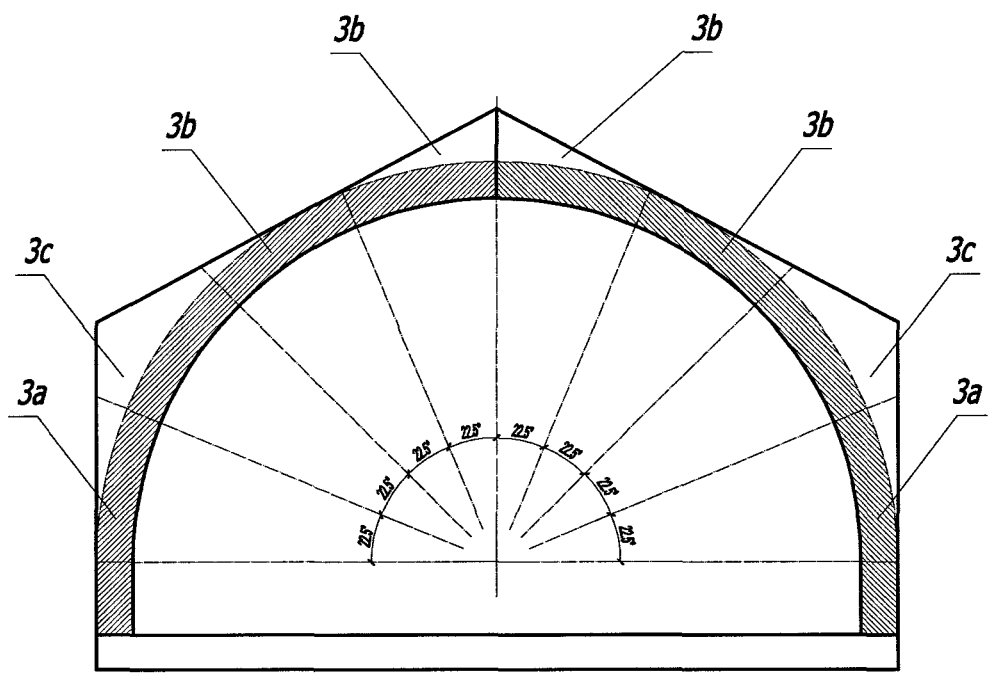
FIG. 8B shows a vertical cross section of still another embodiment of the invention.

FIG. 8B is a vertical cross sectional view of a building according to another embodiment of this invention. The figure shows, a foundation slab 2, wall blocks 3a, center blocks 3c, roof blocks 3b and a conduit for reinforcing pipe 7.

Figure 9A:
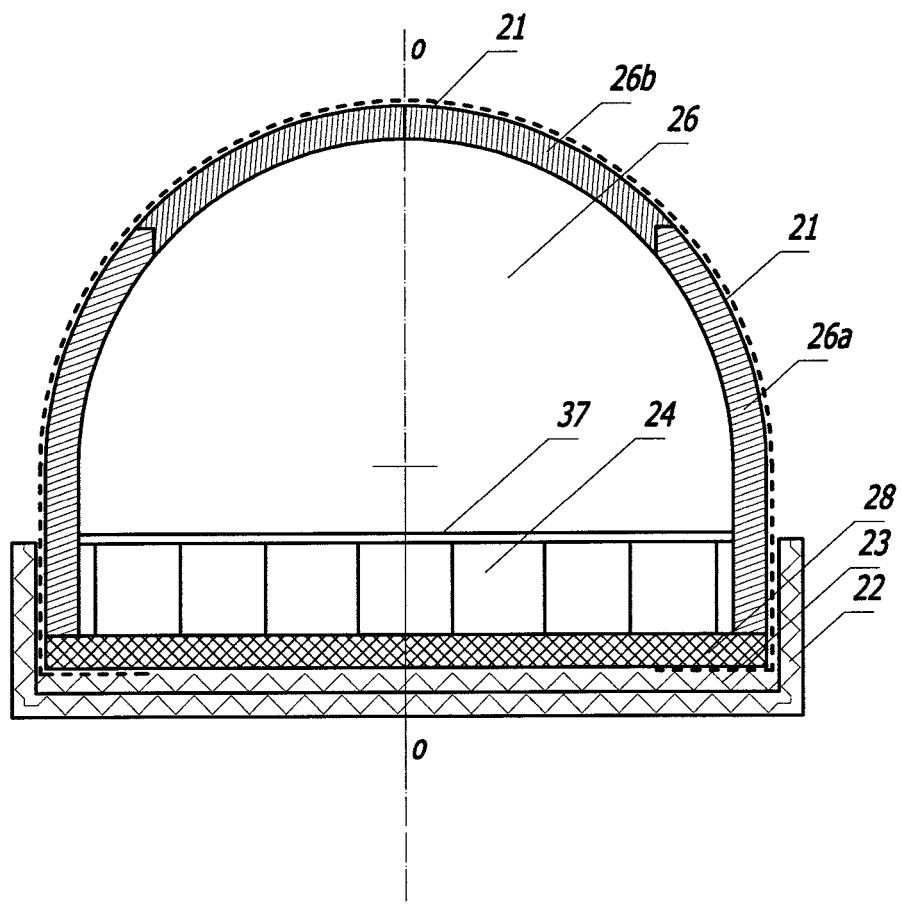
FIG. 9A shows a vertical cross section of another embodiment, namely a floating house.

FIG. 9A is a vertical cross sectional view of a floating house 21 according to one embodiment of the invention. The figure shows floating platform 22, reinforced slab or ballast 23, technical chamber 24, wall blocks 26a and roof blocks 26b, floor 37, fiber glass mesh 33, and floor slab 28.

Figure 9B:
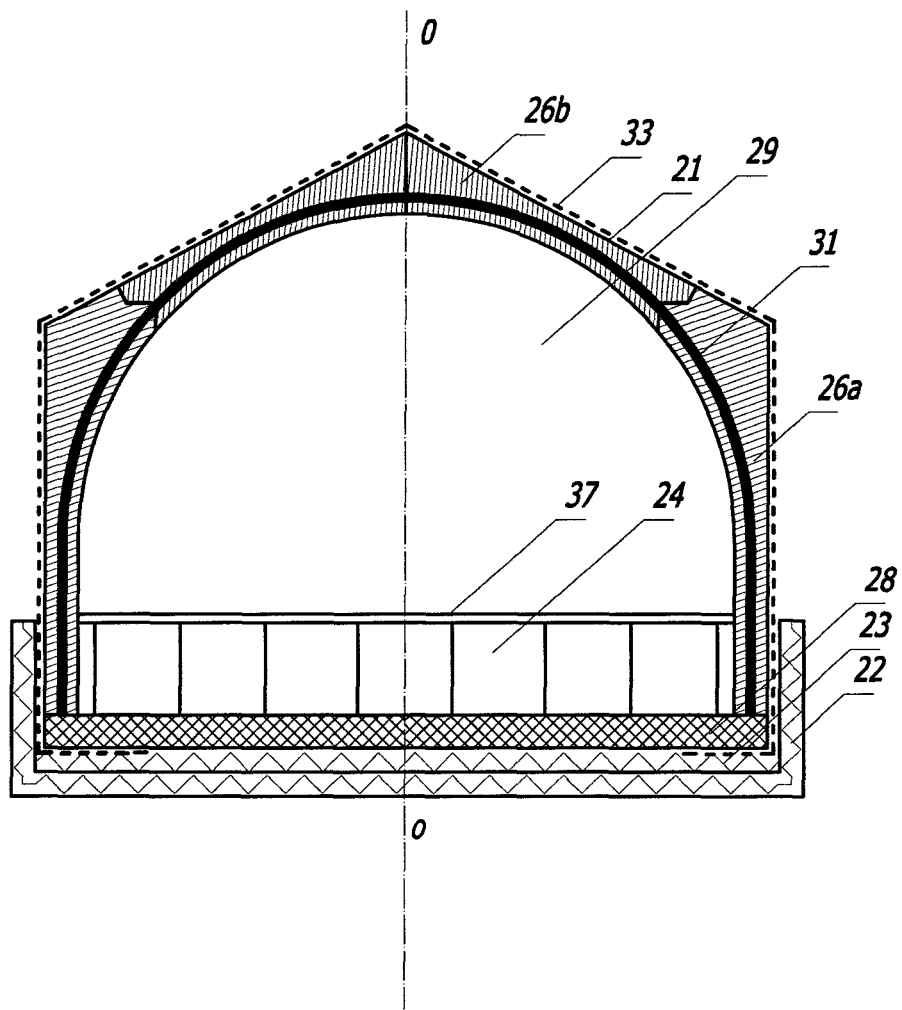
FIG. 9B shows a vertical cross section of another embodiment of a floating house.

FIG. 9B is a vertical cross sectional view of another embodiment of a floating house 21 according to one embodiment of the invention. The figure shows floating platform 22, reinforced slab or ballast 23, technical chamber 24, wall blocks 26a and roof blocks 26b, floor 27, conduit for the reinforcing pipe 31, fiber glass mesh 33, and floor slab 28.

Figure 9C:
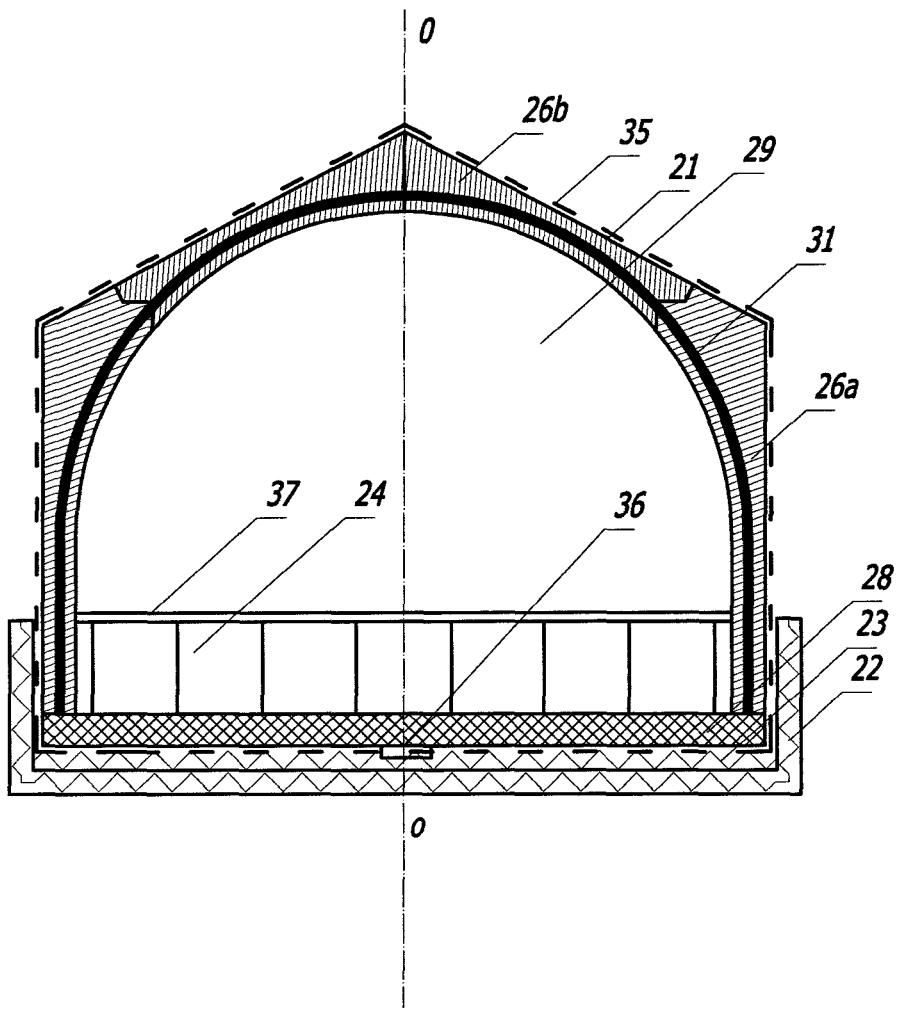
FIG. 9C shows a vertical cross section of yet another embodiment of a floating house.

FIG. 9C is a vertical cross sectional view of another embodiment of a floating house 21. The figure shows floating platform 22, reinforced slab or ballast 23, technical chamber 24, wall blocks 26a and roof blocks 26b, floor 37, conduit for the reinforcing pipe 31, belt to attach the blocks together 35, connection of the belt ends 36 and floor slab 28.

Figure 10:
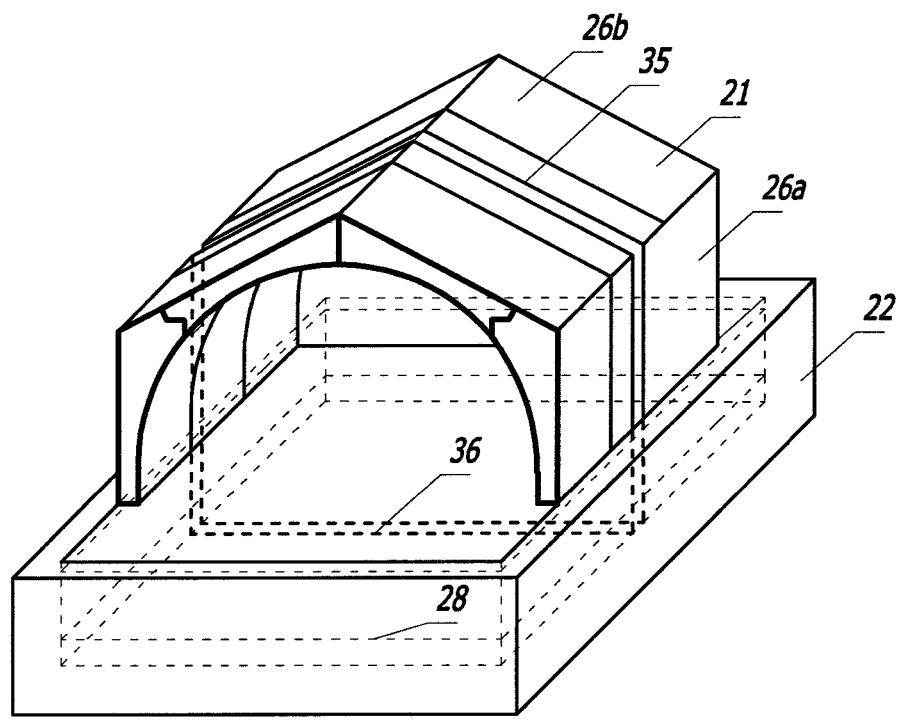
FIG. 10 is a vertical perspective front view of a floating house according to one embodiment.

FIG. 10 is a perspective vertical sectional view of the floating house of this invention. The figure shows the building 21, the roof blocks 26b, the wall blocks 26a, the floating platform 22, the belt 35, the connection of the belt ends 36, and the floor slab 28.

Figure 11A:
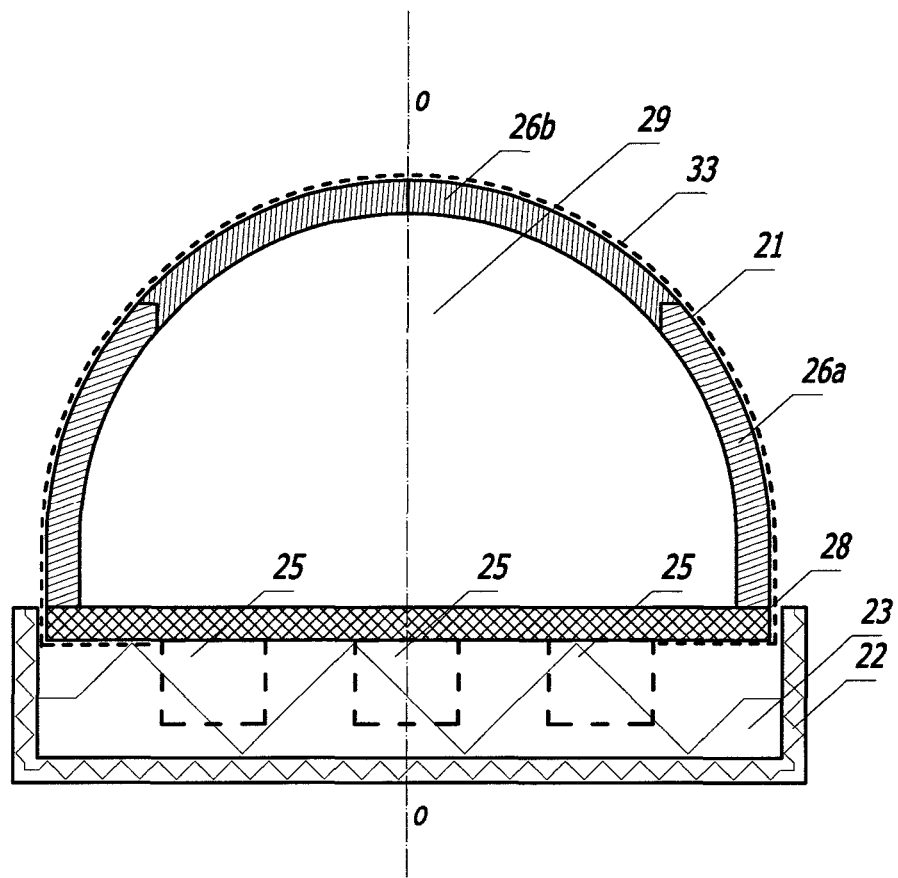
FIG. 11A is a vertical cross section of an embodiment of a floating house.

FIG. 11A is a vertical cross section of the floating house of this invention. The figure shows a wall block 26a, roof block 26b, interior of the building 29, ballasts 25, floor slab 28, floating platform 22, reinforced slab-ballast 23, and reinforcing mesh 33.

Figure 11B:
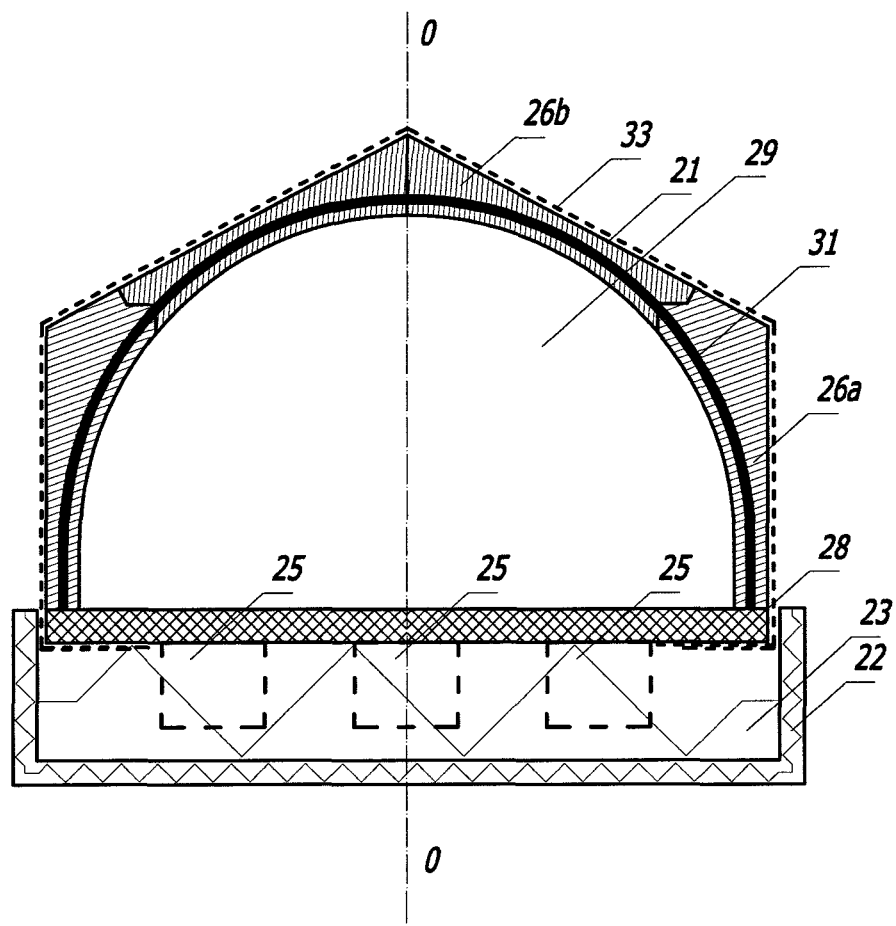
FIG. 11B is a vertical cross section of another embodiment of a floating house.

FIG. 11B is a vertical cross section of the floating house according to one embodiment of this invention. The figure shows a wall block 26a, roof block 26b, interior of the building 29, ballasts 25, floor slab 28, floating platform 22, reinforced slab-ballast 23, reinforcing mesh 33, and conduit for the reinforcing pipe 31.

Figure 11C:
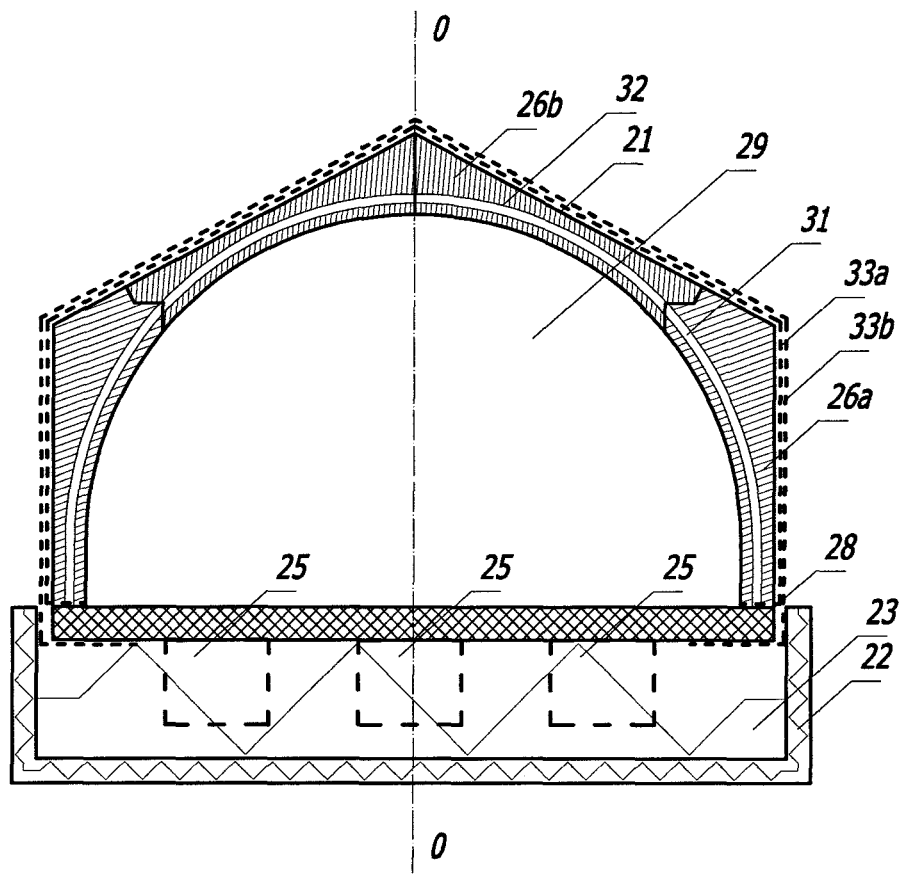
FIG. 11C is a vertical cross section of yet another embodiment of a floating house.

FIG. 11C is a vertical cross section of the floating house according to one embodiment of this invention. The figure shows a wall block 26a, roof block 26b, interior of the building 29, ballasts 25, floor slab 28, floating platform 22, reinforced slab-ballast 23, bottom layer mesh 33a, outer layer mesh 33b, and conduit for the reinforcing pipe 31.

Figure 11D:
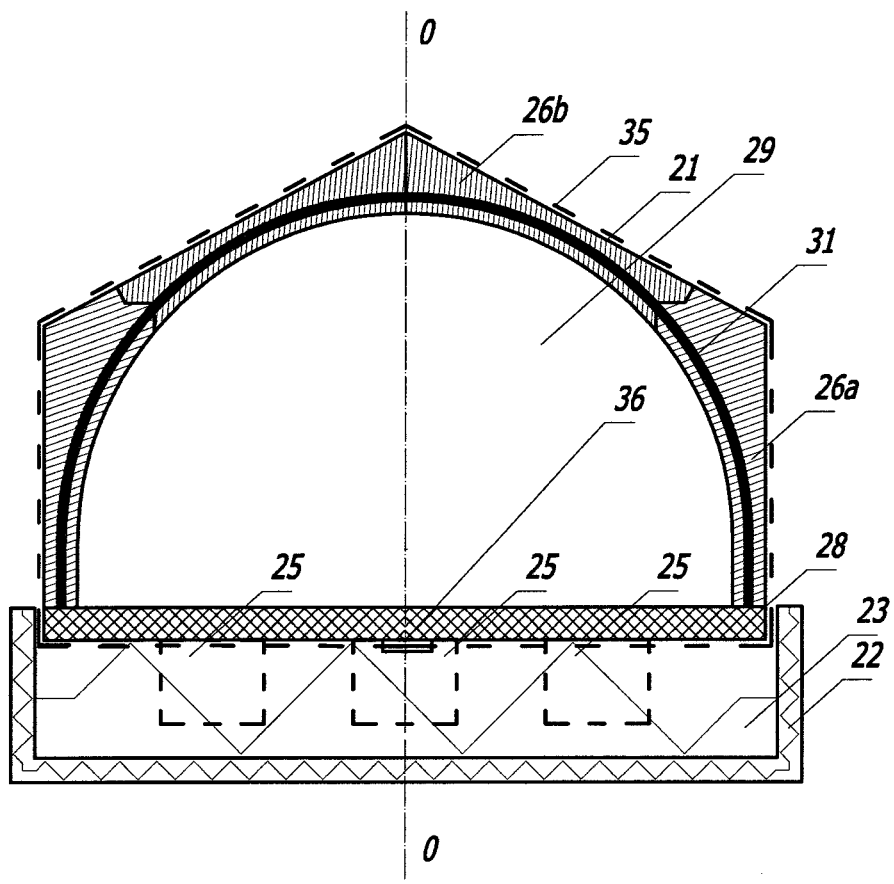
FIG. 11D is a vertical cross section of still another embodiment of a floating house.

FIG. 11D is a vertical cross section of the floating house according to one embodiment of this invention. The figure shows a wall block 26a, roof block 26b, interior of the building 29, ballasts 25, floor slab 28, floating platform 22, reinforced slab-ballast 23, belt 35, connection of belt ends 36, and conduit for the reinforcing pipe 31.

Figure 12:
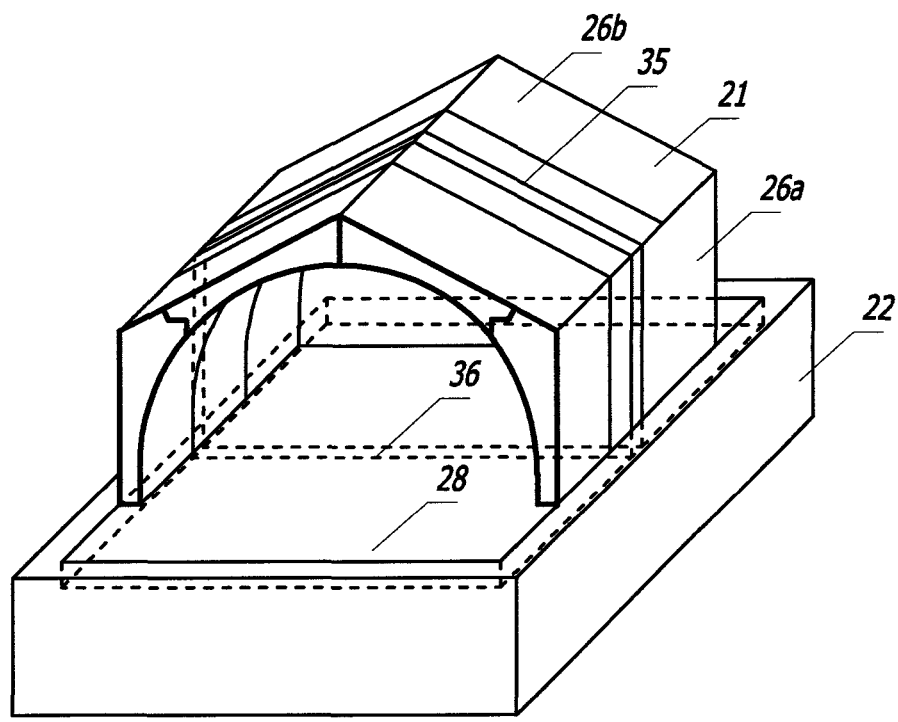
FIG. 12 is a vertical perspective front view of a floating house according to another embodiment.

FIG. 12 is a perspective vertical sectional view of the floating house of this invention. The figure shows the building 21, the roof blocks 26b, the wall blocks 26a, the floating platform 22, the belt 35, the connection of the belt ends 36, and the floor slab 28.

The present invention is now further described by way of example only with reference to accompanying drawings.

EP 2273019 discloses a house structure made of foamed polystyrene or polyurethane blocks. Those structures may be large enough for being used as single story residential houses or storage or office buildings, but the material sets limits to the size of the buildings and can be used only for relatively small one floor buildings. The instant invention comprises a method and structures to extend the vertical dimension of the foam monoliths up to 12 meters and enables building of two or even three story buildings. However, one skilled in the art will realized that monoliths may have smaller dimensions and that such monoliths and buildings made of such monoliths are also within the scope of this invention. Buildings made of elements according to this invention can survive an earth quake of 7.5 on the Richter-scale.

According to one preferred embodiment the structures of this invention are reinforced either by PVC tubes running inside the foam and containing liquid expansive cement to reinforce the structures. According to another preferred embodiment the structures are coiled by fiber glass mesh or mesh made of other material that has similar reinforcing properties.

According to one embodiment the vault structures are secured by one or more belts made of synthetic fiber.

According to one preferred embodiment the foam is lined with plaster board, spray plaster and/or intumescent paint thereby making the structure fire resistant for about 60 minutes.

According to another preferred embodiment the foam is lined with poly-paraphenylene terephtalamide (Kevlar®) to increase resistance of the foam material. A building constructed with such reinforced material is substantially bullet proof.

According to yet another preferred embodiment the foam may be lined with graphite, which increases the thermal capacity of the foam. Alternatively polystyrene foam including graphite (e.g. Neopor®) may be used.

According to one preferred embodiment the building has more than one story.

According to yet another preferred embodiment the building is a floating house.

Now referring to FIG. 1A, one embodiment of this invention is a system having four types of blocks: the wall blocks 3a, the roof blocks 3b and mirror images of both of these types. All the monolithic blocks of the invention have a vertical axis 104. All the blocks have two flat ends 106 (one is shown in FIG. 1A). The monolithic blocks may be wall blocks 3a or roof blocks 3b. All of the blocks have a flat outer surface 140. The wall blocks have an inner surface 130 that is curved perpendicularly with the vertical axis 104 of the block at its top end 116. The roof blocks 3b have an inner surface 130 that is curved perpendicularly with the vertical axis 104 at its top end 116 and its bottom end 118. The wall blocks 3a have a flat lower end 112 and a shaped upper end 114. The roof blocks 3b have preferably a flat upper end 122 and a shaped lower end 124. The upper ends of the wall blocks are shaped such that it matches the shape of the shaped lower end of the roof block. According to one preferred embodiment the upper ends 122 of the roof blocks may also be shaped in a way that the shaped upper end of the roof block matches the shaped upper end of its mirror image roof block. The curvature of the inner surfaces of the blocks is such that by attaching a wall block to a roof block the inner surfaces create a half of a vault. Attaching the mirror image roof block to a mirror image wall block creates another half vault. Attaching the roof blocks of the half vaults together now creates a full vault 200 (not shown in FIG. 1A) that is a half circle with a radius 210 (not shown in FIG. 1A) determined by the dimensions of the blocks. According to a preferred embodiment the radius of the half circle is 6 to 12 meters.

Referring now to FIG. 1B the wall blocks 3a (or roof blocks or center blocks) are attached together from their flat sides 106. According to one preferred embodiment the flat sides have vertical grooves 135 that have a half circle cross section. When the blocks are attached together the vertical grooves form a conduit for reinforcing cement pipe 6 to snugly fit in the formed conduit. FIG. 1B also shows blocks that have connection protrusion 4 which has a half circle cross section and which snugly fits into the groove 135 of adjacent block when a reinforcing pipe is not used.

Referring to FIG. 2A, attaching the wall blocks 3a and roof blocks 3b and their mirror images together form a vault structure 119. One or more vault structures 119 form a foam core 700 of a building when attached together from their flat sides 106.

Referring to FIG. 2B, according to one preferred embodiment the vault structures may be secured by use of a belt 12. The belt may be made of synthetic fiber and belt goes vertically around the building as is shown in FIG. 7. There may be one or more belts in a building.

Referring now to FIG. 8A, one embodiment of the invention is a system comprising six different kinds of blocks: wall blocks 3a, center blocks 3c, roof blocks 3c and mirror images thereof.

Referring now to FIG. 8B, another embodiment of the invention is a system comprising eight different kinds of blocks: wall blocks 3a, center blocks 3c, two roof blocks 3b and mirror images thereof. One skilled in the art would understand that the number of different blocks may be changed and each such variation is within the scope of this invention.

According to this invention the monolith blocks 3a or 3b preferably have a length along the vertical axis 104 of 5 to 12 meters, more preferably 6 to 11 meters and most preferably 6.10 to 10.40 meters. The dimension along horizontal axis 102 of the blocks is preferably 100 and 200 centimeters, more preferably between 120 and 150 centimeters and most preferably 123 centimeters. The thickness of the blocks varies between 25 and 70 centimeters, preferably 30 and 60 centimeters. When the blocks are assembled together the inner surfaces of the blocks 130 form a vault 200. Due to the enforcement structures discussed below, the vault according to the present invention can have vaults substantially larger than have been possible to make with the previously known methods. According to a preferred embodiment the vault 200 is defined as a half circle having a radius 210 between 4 and 15 meters, more preferably 6 and 12 meters. This again allows construction of much larger buildings with same cost effective and fast method.

The building as shown in FIGS. 2A and 2B is constructed by attaching a desired number of the above described vault structures 119 together from their flat sides 106 to form a foam core 700.

According to a preferred embodiment the blocks are put together with glue. However, one skilled in the art would understand that other methods may also be used, such as staples. As is discussed above and shown in FIG. 1B the flat sides 106 of the blocks may be attached by fitting a connection protrusion 4 in the groove 135. Furthermore the attachment of the vault structures 119 may be secured by a belt 12.

Now referring to FIGS. 3A and 3B a preferred embodiment of the invention is described. In order to improve the stability of the structure and especially in order to enable use of monolithic blocks that have a size larger than disclosed in the prior art, the monolithic structures are reinforced by wrapping the structures in reinforcing mesh, preferably a fiber glass mesh 9. The edges of the mesh may be secured under the foundation slab 2 or they may be secured by separate attaching elements 10 to attach the edges. FIG. 3B shows the separate elements 10 and how the edges is attached between the elements. The elements may be made of concrete.

Referring now to FIG. 4, the stability of the structure may be reinforced by liquid cement pipes. FIG. 4 shows the conduit for the reinforcing pipe 5. The pipes according to this invention are preferably PVC pipes having a cross section between 5 to 30 centimeters, and more preferably between 10 to 25 centimeters. As is shown in FIG. 4 the reinforcing pipes may be used in addition to the reinforcing fiber mesh 9.

According to one preferred embodiment, the foam blocks have prefabricated tunnels for inserting the liquid cement pipes. Referring now again to FIG. 1 B, according to a preferred embodiment the wall, roof and optional center blocks have vertical grooves 135 preferably with a cross section of a half circle on both of their flat sides 106. When two blocks are attached together the adjacent grooves form a tunnel to fit an enforcing liquid cement filled pipe 6 snugly inside the tunnel.

According to a preferred embodiment the pipes 6 are installed so that the distance between two pipes is 100 to 200 centimeters, preferably 120 centimeters. According to one preferred embodiment of the invention there is one pipe in each vault structure 119 unit formed by a wall block 3a, a roof block 3b and their mirror images or by a wall block 3a, a center block 3c and a roof block 3b and their mirror images.

Now referring to FIGS. 5A and 5B, according to another preferred embodiment the building according to this invention is reinforced by a double layered fiber glass mesh 9. According to a preferred embodiment the mesh size is 4 mm times 4 mm, but other mesh size can also be used.

According to one preferred embodiment the fiber mesh coils the whole building structure. According to another preferred embodiment the fiber mesh coils only a bottom section of the building structure. According to one preferred embodiment the fiber mesh coils about 20 to 100 centimeters of the building structure when measured from the ground, preferably about 50 cm of the building structure is covered.

According to one preferred embodiment the fiber mesh is attached to the building structure with plaster. One layer of plaster is spread on the foam structure, the fiber glass mesh is attached to the plaster and another layer of plaster is spread on top of the foam structure. According to another embodiment, the foam blocks have notches where the fiber mesh is attached.

As is shown in FIGS. 5A and 5B a double layered fiberglass mesh 9a and 9b is coiled around the whole building. The double layered fiberglass mesh consists of an inner layer 9a and an outer layer 9b. The loose edges of the outer layer of the fiber glass mesh 9b are wrapped under the foundation slab 2. The loose edges of the inner layer of the fiber glass mesh 9a are sandwiched between the foundation slab 2 and flat lower ends of the 112 of the wall blocks. According to a preferred embodiment the loose edges sandwiched between the foundation slab and the flat lower ends of the wall block is about 20-50 cm long, more preferably about 30 cm. According to a preferred embodiment the loose edges of the outer layer of the fiber glass mesh are wrapped under the foundation slab throughout the breadth of the building. According to another preferred embodiment the loose ends of the outer layer are wrapped under the foundation slab at least for a length of 60 centimeters.

According to one preferred embodiment the loose edges of the outer layer of the fiber glass mesh is set on the foundation slab when the slab concrete is still wet and the fiber glass mesh sticks on the slab that.

Now referring to FIG. 5C, in addition to the double layered fiber glass mesh 9a, 9b, the structure may be enforced with a third layer of fiber glass mesh 9c. According to this embodiment the third layer 9c may not wrap the full structure but only 30 to 100 cm from the bottom of the building. The loose edges of the third layer are sandwiched between the ground and the foundation slab 3. This embodiment is specifically preferred when the building is erected in area where temperatures drop below 0° C.

An advantage of this invention is that buildings with more than one story may be built with the foam structures. FIGS. 6A and B show such embodiment. The double layered fiber glass mesh may now be used to wrap only the upper story of the building and the inner layer of the mesh 9a is sandwiched between attaching elements 10 locating at the level of the second story floor 14. The outer layer of the mesh 9b is wrapped over the first floor and sandwiched under the foundation slab 2.

Now referring to FIG. 7, according to one embodiment of the invention the vault structures may be secured by a belt 12 that is preferably made of synthetic fiber and wrapped around the building. The ends of the belt are attached with a connection 15 under the foundation slab 2. There may be one or more belts in a building.

Another embodiment of the instant invention is a floating building or floating home. Such floating building is shown in FIGS. 9-12. Even if the numbering of the elements in FIGS. 9-12 is not equal with the numbering of FIGS. 1-11, the elements are substantially similar. The floating building has wall blocks 26a and roof blocks 26b attached to each other similarly as described above. All the variations described in relation to FIGS. 1-8 apply here also. A fiber glass mesh 33 and/or reinforcing pipes 31 may be used similarly as described above. Instead of foundation slab the floating building has floating platform 22 and a floor slab 28. As is shown in FIGS. 9A and B, the loose edges of the fiber mesh 33 may be sandwiched between the floating platform 22 and the floor slab 28. FIG. 9C shows how the fiber belt 35 may be used similarly as described above to secure the vault structures. The belt connection 36 is now under the floating platform 22. FIG. 11C shows use of double layered mesh 33a, 33b and how the edges of the inner mesh are sandwiched between the floating slab 22 and the floor slab 28, and the outer mesh edges are sandwiched between the ends of the wall blocks 3a ends and the floor slab 28.

An advantage of this invention in addition to the easy transport and erection of the buildings is the low energy demand. The total demand for energy needed for warming a house with 100 square meters living area and heating water is about one third of the demand of traditional building. For example a traditional building may use 180 Wh/m2 in a year while a building with same size made of monolithic blocks according to this invention may use 50 kWh/m$^2$ per year. The technology also enables achieving standards of passive house: by using mechanical ventilation with recuperation, a soil heat exchanger and heat pumps a final energy demand of a building according to this description may be 15 kWH/m$^2$.

One skilled in the art would recognize that in addition to residential buildings, the method and materials of this invention can be used for office buildings, storage buildings, and even for boat homes.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A reinforced two story foam block building made of multiple monolithic foam blocks and comprising:
   a) at least two vault structures formed of a first and a second half vault, said first and second half vaults being mirror images to each other, each first and second half vault comprising:
      i. a wall block having
         a vertical wall axis,
         a horizontal wall axis,
         two flat sides,
         an upper wall end,
         a flat outer wall surface, and an inner wall surface having a bottom end and a top end, and the inner wall surface being curved perpendicularly with the wall vertical axis from the top end and being flat at the bottom end;
      ii. a roof block having
         a vertical roof axis,
         a horizontal roof axis,
         two flat sides, a lower roof end,
a flat upper roof end,
a flat outer roof surface, and
an inner roof surface having a bottom end and top end, and the inner roof surface being curved perpendicularly with the vertical roof axis from the bottom and the top ends;

the wall blocks and the roof blocks being attached to each other by fitting the lower roof ends of the roof blocks to the upper wall ends of the wall blocks thereby forming the first and the second half vaults;

the first and the second half vaults being attached together to form the vault structure;

two or more vault structures being attached together from the flat sides of the wall blocks and the flat sides of the roof blocks, thereby forming a foam core of the building;

b) a second story floor attached to the wall blocks of each half vault; and c) a double layered fiberglass mesh coiled around the foam core, and having an inner layer and an outer layer,
the outer layer having edges and said edges being wrapped under the foundation slab, and
the inner layer having edges sandwiched between attaching elements, said attaching elements located in the wall blocks at the level the second story floor;
wherein the vertical axis of the blocks is 5-7 meters and the thickness of the blocks is 30 to 60 cm.

\* \* \* \* \*